(12) United States Patent
Bodum

(10) Patent No.: US 7,975,946 B2
(45) Date of Patent: Jul. 12, 2011

(54) COMBINED SALT AND PEPPER MILL

(75) Inventor: Jørgen Bodum, Meggen (CH)

(73) Assignee: PI-Design AG, Triengen (CH)

( * ) Notice: Subject to any disclaimer, the term of this patent is extended or adjusted under 35 U.S.C. 154(b) by 216 days.

(21) Appl. No.: 12/307,319

(22) PCT Filed: Jun. 1, 2007

(86) PCT No.: PCT/CH2007/000276
§ 371 (c)(1),
(2), (4) Date: Jan. 2, 2009

(87) PCT Pub. No.: WO2008/006230
PCT Pub. Date: Jan. 17, 2008

(65) Prior Publication Data
US 2009/0314867 A1 Dec. 24, 2009

(30) Foreign Application Priority Data
Jul. 13, 2006 (CH) ........................................ 1128/06

(51) Int. Cl.
*A47J 17/18* (2006.01)
*A47J 17/00* (2006.01)
*A47J 43/00* (2006.01)

(52) U.S. Cl. .................... 241/169; 241/101.3; 241/169.1

(58) Field of Classification Search .................. 241/169, 241/169.1, 101.3
See application file for complete search history.

(56) References Cited

U.S. PATENT DOCUMENTS

| 2,974,887 | A | * | 3/1961 | Grandinetti | 241/101.2 |
| 4,709,865 | A |   | 12/1987 | Bounds |   |
| 4,844,352 | A |   | 7/1989 | Griffin |   |
| 7,637,447 | B2 | * | 12/2009 | Tang | 241/169.1 |
| 2002/0130208 | A1 | * | 9/2002 | Pedersen | 241/169.1 |

FOREIGN PATENT DOCUMENTS
GB 2 183 173 A 6/1987
* cited by examiner

*Primary Examiner* — Bena Miller
(74) *Attorney, Agent, or Firm* — Sughrue Mion, PLLC

(57) ABSTRACT

A spice mill for cutting up two different spices, in particular salt and pepper, is disclosed. Two spice containers (17, 18) and two grinding mechanisms (50, 50') are arranged in a base part (10). A cover part (20) can be removed from the base part (10) and serves as a rotary handle. When the cover part (20) is removed, filling openings (15, 16) for the spice containers (17, 18) are opened up. An encapsulated gear mechanism (30) is arranged in the base part (10) between the cover part and the grinding mechanisms. When the cover part (20) is rotated in a first direction of rotation, the gear mechanism (30) drives the first grinding mechanism (50). By contrast, upon rotation in the opposite direction, the second grinding mechanism (50') is driven. In a preferred embodiment, the gear mechanism is arranged in an upper region of the base part and, together with the base part, bounds the filling openings.

13 Claims, 5 Drawing Sheets

COMBINED SALT AND PEPPER MILL

TECHNICAL FIELD

The present invention relates to a spice mill for crushing two different condiments, in particular salt and pepper.

PRIOR ART

U.S. Pat. No. 4,709,865 discloses a spice mill having two separate spice containers which can receive different condiments, for example peppercorns and salt crystals. A grinding mechanism is provided at the bottom of each spice container to crush the condiments. Starting from the grinding mechanisms, a shaft extends upward through each of the spice containers to drive the grinding mechanism in question, a gear wheel being attached to the upper end of each shaft. Provided at the upper end of the spice containers is a gear mechanism containing a pivotable gear wheel which enters into engagement with the gear wheel on one shaft when the gear mechanism is driven in one direction and enters into engagement with the gear wheel of the other shaft when the gear mechanism is driven in the opposite direction. The containers are upwardly sealed by a spring-loaded covering which can be raised and rotated through 90 degrees in order to add spices to the spice containers. Located above and separate from the covering is a rotary handle which can be rotated manually and drives the gear mechanism via a central shaft extending through the covering.

This spice mill has the drawback that it is comparatively awkward to add the condiments to their respective containers. This requires the covering to be raised, along with the rotary handle, counter to a spring force and to be rotated about the central shaft through 90°. In addition, the proposed design does not allow the spice mill to be produced with a round outline, as it would not be possible in this case to rotate the covering in such a way as to allow the spices to be added. The possible configurations are therefore limited. Furthermore, the construction of this spice mill is comparatively complex, as a tensile spring force has to be provided in order to prestress the covering downward when closed. The gear mechanism of this spice mill can become contaminated when the condiments are added and as a result become damaged.

U.S. Pat. No. 4,844,352 proposes a spice mill which has two grinding mechanisms and a round outline. In this spice mill, a cover part, which at the same time also serves as a rotary handle, can be removed as a whole. The cover part contains a gear mechanism which ensures that the first grinding mechanism is driven during rotation of the cover part in the clockwise direction and the second grinding mechanism is driven during rotation in the counterclockwise direction. This gear mechanism is connected to the grinding mechanisms releasably via two shafts. One drawback of this design is that the cover part becomes very large and heavy. On the other hand, when the spices have been added, the cover has to be attached to the base part in a highly specific position in order that the two shafts for the grinding mechanisms return to their respective guides in the gear mechanism.

SUMMARY OF THE INVENTION

It is therefore an object of the present invention to provide a spice mill for crushing two different condiments that avoids the above-mentioned drawbacks. It is in particular an object of the present invention to disclose a spice mill of the type that has a simpler construction and in which the condiments can be added in a simple manner. A spice mill of this type is particularly suitable as a mill for salt and pepper.

This object is achieved by a spice mill having the features of claim 1. Advantageous embodiments are disclosed in the dependent claims.

The spice mill therefore comprises a base part having a first and a second spice container and a first and a second grinding mechanism. The spice containers are arranged next to each other and preferably separated from each other by a vertical partition. The first grinding mechanism is arranged at a lower end of the first spice container, and the second grinding mechanism is arranged at a lower end of the second spice container. Arranged on the base part is a cover part which can be removed from the base part to allow condiments to be added to the spice containers. In other words, when the cover part is removed from the base part, it uncovers upper filling openings in the first and second spice container. This cover part serves at the same time as a rotary handle for driving the grinding mechanisms. Interposed between the cover part and the grinding mechanisms is a gear mechanism which serves in each case selectively to drive only one of the grinding mechanisms. The gear mechanism is connected on the one hand to the grinding mechanisms, on the other hand to the cover part, for example via suitable shafts. The gear mechanism is formed in such a way that it drives the first grinding mechanism when the cover part is rotated in a first predetermined direction (for example in the clockwise direction). When, by contrast, the cover part is rotated in the opposite direction (in this case in the counterclockwise direction), the second grinding mechanism is driven, preferably in the same direction as the first grinding mechanism. The gear mechanism is arranged in the base part and encapsulated in a housing toward the spice containers.

In this way, the cover part can be configured very simply, allowing very broad latitude for configuring the shape of the base part and the cover part. In that the gear mechanism is encapsulated, it cannot become soiled by the spices added. The gear mechanism can be arranged at various locations in the base part. In a simple configuration, the gear mechanism can be arranged for example in a lower region of the base part, for example immediately above the grinding mechanisms. Preferably, however, the gear mechanism is arranged in an upper region of the base part.

In an advantageous configuration, the gear mechanism is arranged in the upper region of the base part in such a way that the housing of the gear mechanism at least partly bounds the filling openings. The dimensions of the gear mechanism are therefore such that sufficient space remains between the gear mechanism and an outer wall of the base part to introduce the spices through this space. At the same time, the gear mechanism forms in this way an upper boundary of the main chambers of the spice containers.

This high arrangement of the gear mechanism is particularly advantageous above all when the side walls of the spice container are at least partly transparent or translucent. In this case, the transparent or translucent region of the side walls can be arranged in such a way that an upper edge of the side wall extends substantially at the same level as a lower edge of the housing of the gear mechanism or below this lower edge. In this way, the gear mechanism is withdrawn from the direct viewing angle, while it is possible at all times visually to ascertain whether the spice containers still contain sufficient condiments.

The spice mill according to the present invention allows broad configurational latitude in the design.

Preferably, the spice mill has a substantially circular outline.

Generally, the gear mechanism will rest downward on the shafts extending between the gear mechanism and the grinding mechanisms. However, alternatively or additionally, the gear mechanism can, together with its housing, also rest on a partition or be fastened to a partition which extends upward from a bottom of the base part and separates the first and second spice containers from each other. This partition is preferably also transparent or translucent.

A guide bush for the cover part, which bush is connected to an outer wall region of the base part via at least two webs, is preferably formed in an upper region of the base part. The guide bush serves to mount and to guide the cover part when it is rotated for driving the gear mechanism. The guide bush has for this purpose preferably a cylindrical opening having an internal cylindrical bearing face into which a corresponding guide element of the cover part can be inserted. This guide bush is connected to the housing of the base part via the webs. In this way, the gear mechanism is relieved from forces for guiding the cover part and from compressive forces from above. Preferably, the outer wall region of the base part, the webs and the guide bush are formed from one piece. This simplifies manufacture.

Preferably, the gear mechanism adjoins immediately below the guide bush. In other words, the housing of the gear mechanism is preferably arranged below the guide bush and adjoins same.

A drive shaft extending upward from the gear mechanism is preferably provided for driving the gear mechanism. The cover part can then be releasably connected to the drive shaft in such a way that a non-positive and/or positive connection is produced in the two directions of rotation. For example, the drive shaft can in its upper region be polygonal, in particular formed as a square, and the cover part has an opening which is complementary thereto and is placed onto the upper part of the shaft. However, it is also possible to screw the cover part to the drive shaft or to bring it into frictional engagement therewith in a suitable manner.

A gear mechanism which is a development of the gear mechanism disclosed in U.S. Pat. No. 4,709,865 is preferably used for driving the grinding mechanisms. The gear mechanism has a first, second, third and fourth gear wheel. The first, central gear wheel is connected to the cover part via the drive shaft and is driven by said cover part. A second gear wheel, which is mounted on a pivotable arm, is in engagement with the first gear wheel. This arm can pivot about the axis of rotation of the first gear wheel, i.e. about the drive shaft. It is connected to the first gear wheel or the drive shaft via a slight frictional engagement. When the drive shaft is rotated in a first direction, it entrains the arm and as a result pivots the second gear wheel until it enters into engagement with the third gear wheel. When, by contrast, the drive shaft is rotated in the opposite direction, it entrains the arm in this direction until the second gear wheel enters into engagement with the fourth gear wheel.

When the third and the fourth gear wheel drive their grinding mechanisms directly via a shaft, the grinding mechanisms will each rotate in the same direction of rotation as that in which the cover part is rotated, i.e. in opposite directions. However, this is often undesirable, as grinding mechanisms are generally manufactured with a preferred direction and therefore the two grinding mechanisms which are fitted in the spice mill should if possible be driven in the same direction of rotation. For this reason, a fifth gear wheel, which drives the second grinding mechanism, is preferably provided. This fifth gear wheel is in engagement with the fourth gear wheel which in this case serves merely as an auxiliary gear wheel. This inverts the direction of rotation of the second grinding mechanism a further time, so that the second grinding mechanism rotates in all cases in the same direction of rotation as the first grinding mechanism.

BRIEF DESCRIPTION OF THE DRAWINGS

Preferred embodiments of the invention will be described hereinafter with reference to the drawings, in which.

DETAILED DESCRIPTION OF PREFERRED EMBODIMENTS

Figure 1:
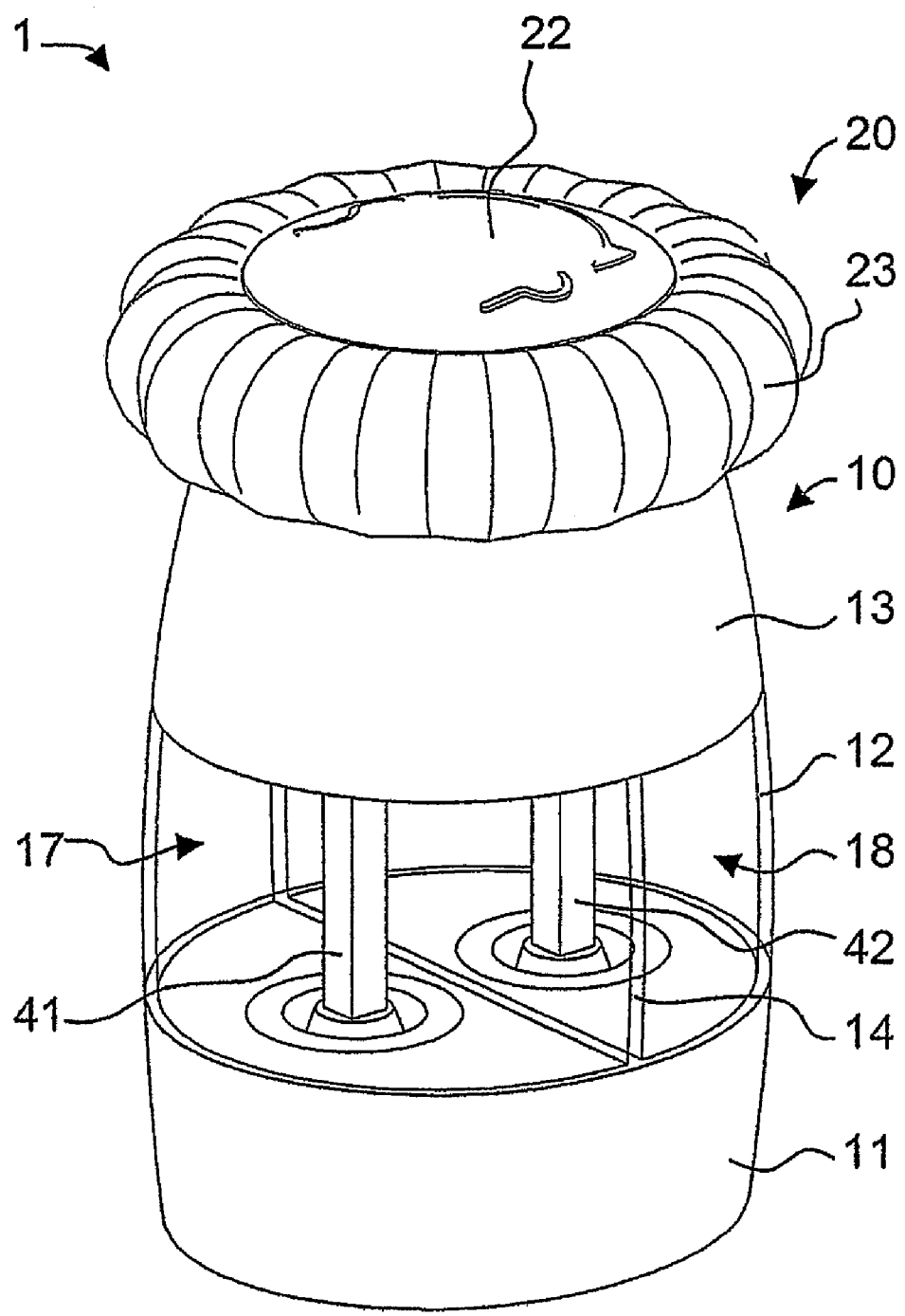
FIG. 1 is a perspective view of a salt and pepper mill according to the invention.
Figure 2:
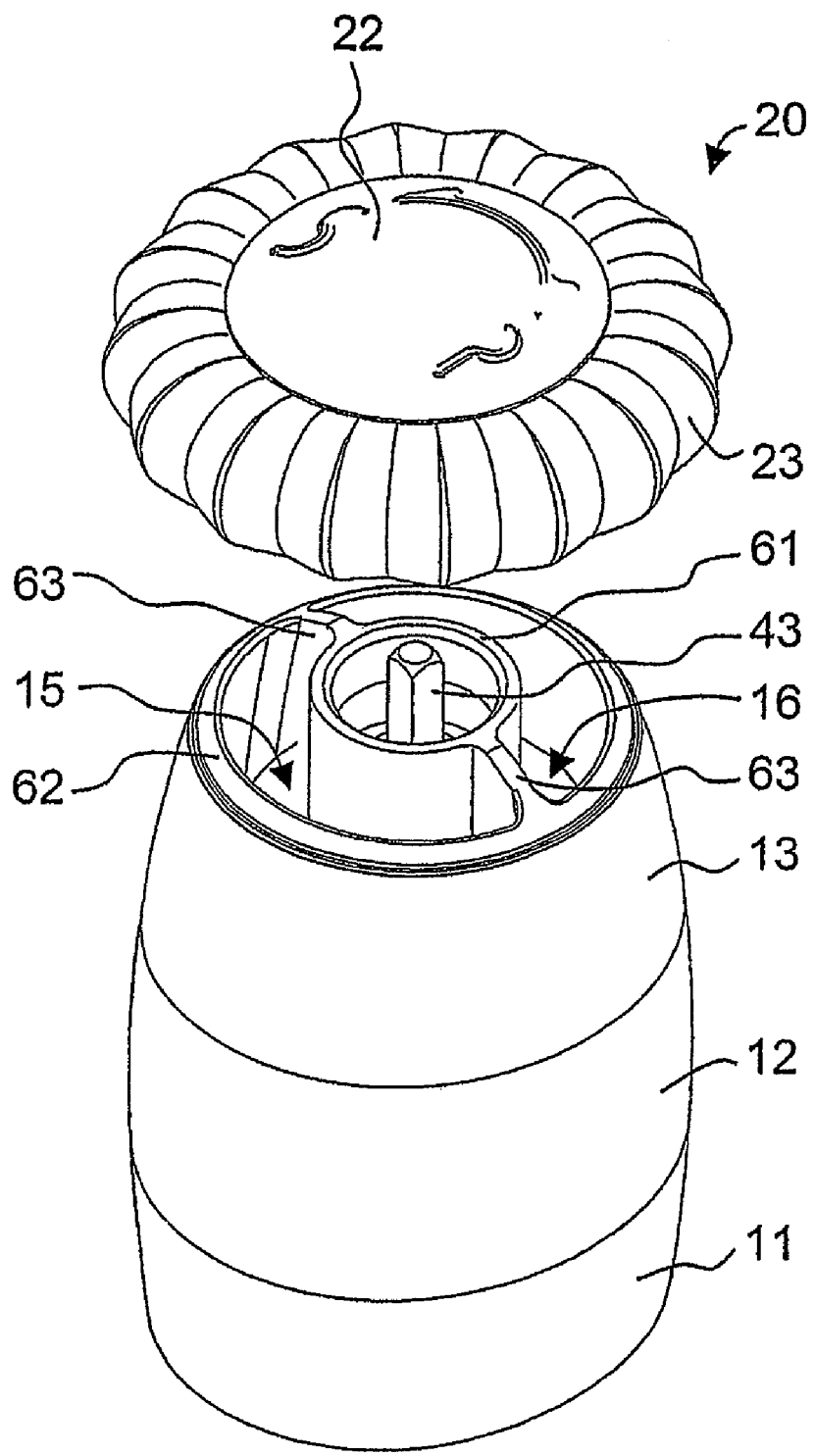
FIG. 2 is a perspective view of the salt and pepper mill of FIG. 1 with the cover part removed.
Figure 3:
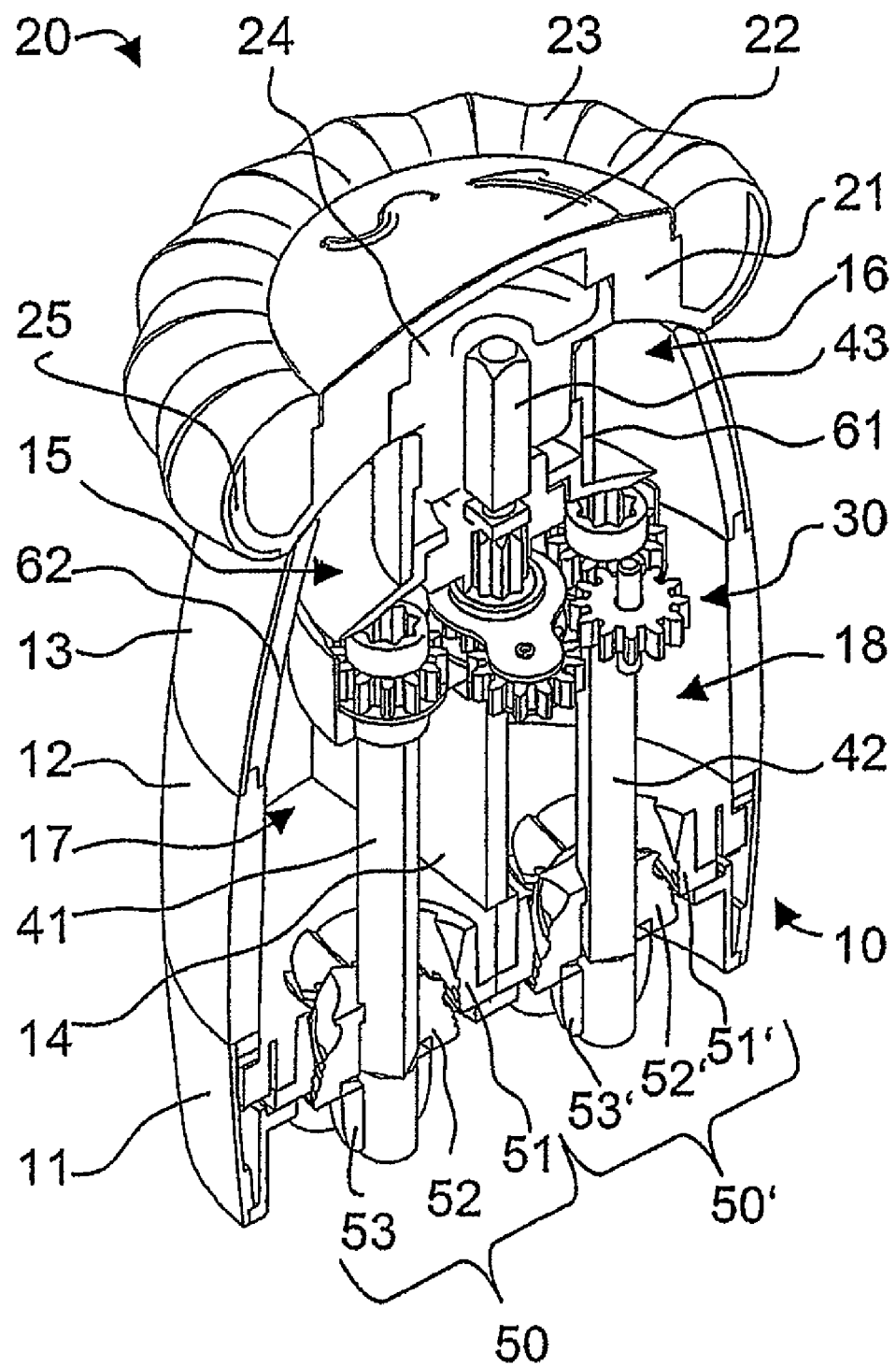
FIG. 3 is a perspective partial cross section of the salt and pepper mill of FIG. 1.

FIGS. 1 to 4 are various views of a salt and pepper mill according to the invention.

The salt and pepper mill 1 has a base part 10 and a cover part 20 which can be removed therefrom. The base part 10 has a multipart housing comprising in particular a housing lower part 11, a transparent wall 12 and a housing upper part 13. The housing is divided by a partition 14 into two separate spice containers, namely a salt container 17 and a pepper container 18.

Obviously, the mill is however also suitable for other condiments. The housing lower part 11 forms the bottom of these containers, a respective grinding mechanism 50 or 50' being arranged in each container bottom. The grinding mechanisms are conventionally constructed, with a conical grinding wheel 52, 52' as the rotor running in a counter bearing 51, 51', also referred to as the grinding cylinder, as the stator. Each of the grinding wheels 52, 52' is fixed to a respective square shaft 41, 42 by a fixing nut 53, 53' formed as a thumb nut. The shafts 41, 42 connect each of the grinding mechanisms 50, 50' to a gearbox 30 which will be described in greater detail hereinafter. A drive shaft 43 extends upward out of the gearbox 30. This drive shaft 43 is also formed in the shape of a square. The function of the gearbox is as follows: when the drive shaft is rotated in the clockwise direction, the rotor 52 of the first grinding mechanism 50 is rotated. When, by contrast, the drive shaft is rotated in the counterclockwise direction, the rotor 52' of the second grinding mechanism 50' is rotated, in the same direction as the rotor of the first grinding mechanism. In this way, one grinding mechanism is selectively driven, depending on the direction of rotation of the drive shaft, in the same direction of rotation.

The gearbox 30 is located in an upper region of the base part 10. Its dimensions are such that there remains between the gearbox and the outer wall of the housing upper part 13 a sufficiently large annular gap to introduce salt or pepper into the respective container 17 or 18 through this gap. The gearbox therefore bounds, together with the housing upper part 13, two filling openings 15, 16.

A guide bush 61 for the cover part 20 is located immediately above the gearbox. This substantially annular or cylindrical guide bush is connected to the outer wall region 62 of the housing upper part 13 via two webs 63 and made in one piece with said outer wall region.

The cover part 20 has a carrier 21 which is surrounded radially by an annular gripping region 23 made of a comparatively softer material than the carrier 21. In order to fix the gripping region 23 to the carrier 21, the carrier 21 has on its outer edge a peripheral region 25 which is bent over in the first place radially outwardly and then upwardly and acts as a barb for the rotary handle 23. The carrier 21 is upwardly covered by a cover plate 22. A guide and connecting element 24, the outer contour of which is cylindrical and complementary to the inner contour of the guide bush 61, is downwardly fixed, for example screwed-in, pressed-in, inserted or bonded-in, in the carrier 21. In this way, the cover part 20 is guided in the guide bush 61. The connecting element 24 has a central opening which has a square outline and is complementary to the outer contour of the drive shaft 43. This produces a positive engagement between the shaft 43 and the cover part 20 in both the clockwise and the counterclockwise direction. Upwardly, the cover part 20 is held either solely by the frictional force between the connecting element 24 on the one hand and the shaft 43 or the guide bush 61 on the other hand, or a releasable locking connection (not illustrated) is provided. For a locking connection of this type, there are various possibilities, for example in the form of spring tabs on the guide bush 61 that protrude into an annular depression in the connecting element 24.

Figure 5:
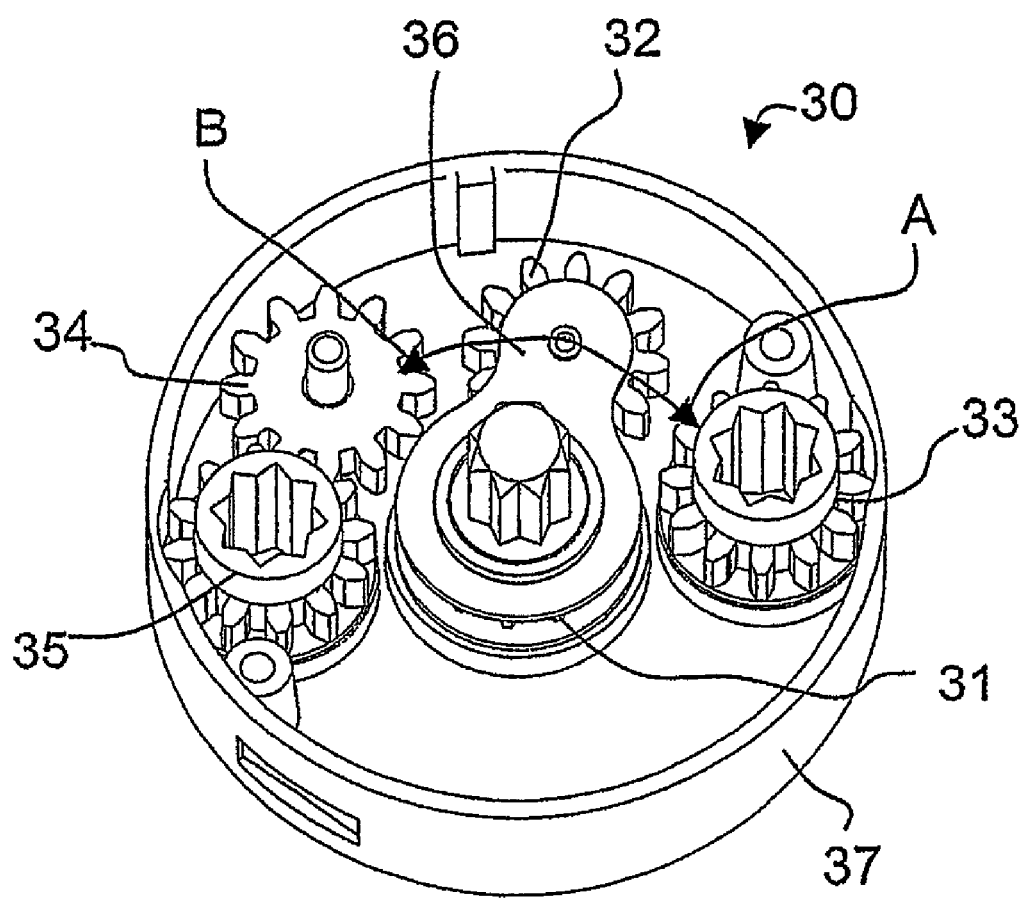
FIG. 5 is a perspective partial view of a gearbox.

The construction and the functions of the gearbox 30 will be described hereinafter with reference to FIG. 5. A lower part 37 of the housing for the gear mechanism contains a total of five gear wheels. A central gear wheel 31 is located in the extension of the drive shaft 43. A second gear wheel 32 is in engagement with the first gear wheel 31. This gear wheel 32 is mounted on a pivotable arm 36 (or between two arms of this type), so that it can pivot between a third gear wheel 33 and a fourth gear wheel 34. During pivoting in the first direction A the gear wheel 32 enters into engagement with the gear wheel 33, whereas during pivoting in the direction B it enters into engagement with the gear wheel 34. The pivoting arm 36 is mounted on the gear wheel 31 in such a way that it is entrained, owing to the friction with the gear wheel 31, until the gear wheel 32 enters into engagement with one of the two gear wheels 33 and 34 and as a result the pivoting arm 36 is prevented from continuing to pivot in the direction in question. The frictional force is in this case so slight that the rotation of the gear wheel 31 is not significantly impeded. The gear wheel 33 is connected directly to the grinding mechanism 50 via the shaft 41. During rotation of the cover part 20 in the clockwise direction, the gear wheel 31 is rotated in the clockwise direction via the drive shaft 43, as a result of which the gear wheel 32 is pivoted in the pivoting direction A and enters into engagement with the gear wheel 33. This drives the first grinding mechanism 50. During rotation of the cover part 20 in the clockwise direction, the rotor 52 of the first grinding mechanism 50 is therefore ultimately rotated in the clockwise direction. During rotation of the cover part in the counterclockwise direction, the gear wheel 32 is, by contrast, pivoted in the pivoting direction B and enters into engagement with gear wheel 34. This auxiliary gear wheel 34 is in turn in engagement with a further gear wheel 35. It serves to invert the direction of rotation of the gear wheel 35 which is connected to the second grinding mechanism 50' via the shaft 42. During rotation of the cover part 20 in the counterclockwise direction, this rotation is transmitted via the gear wheels 31, 32, 34 and 35 in such a way that the rotor 52' of the second grinding mechanism 50' is rotated in the clockwise direction. This ensures that each of the two grinding mechanisms 50, 50' is rotated at all times, irrespective of the direction of rotation of the cover part 20, in the same direction of rotation, namely in the clockwise direction.

Figure 4:
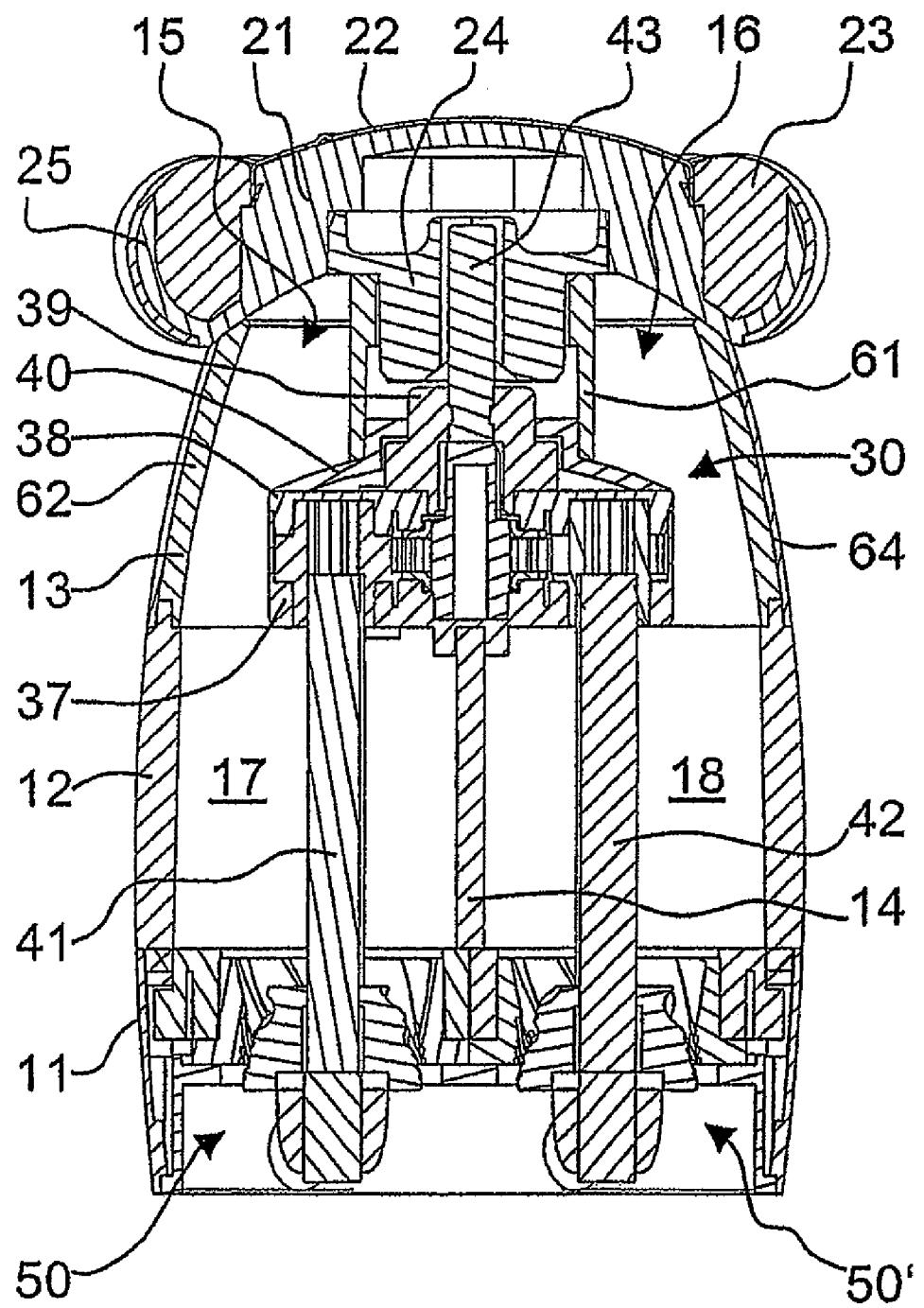
FIG. 4 is a sectional view of the salt and pepper mill of FIG. 1.

As is particularly clear from FIG. 4, the gearbox is upwardly closed off by a housing upper part 38. The drive shaft 43, onto which is slid a bearing element 39 which rotates with the drive shaft 43, extends upward out of the housing upper part 38. A cap-like covering 40 is slid via the bearing element 39. The housing lower part 37, the housing upper part 38, the bearing element 39 and the covering 40 jointly outwardly bound the gearbox 30. In particular, these parts bound at least partly the filling openings 15 and 16 for the salt crystals and peppercorns respectively. In addition, the gearbox bounds the actual main chambers of the spice containers 17 and 18 upwardly.

Preferably, the salt and pepper mill is made of the following materials: the housing of the base part 10 is made preferably in the non-transparent regions of the impact-resistant plastics material ABS and is outwardly additionally covered preferably by a thin layer which is made of stainless steel and serves a protective and a decorative purpose (as may be seen as the sheathing 64 in FIG. 4). The transparent wall 12 is made, like the partition 14, preferably of acrylic glass. The grinding mechanisms are preferably made of a ceramic material having high corrosion resistance. High corrosion resistance is particularly important for that grinding mechanism which enters into contact with the salt. The carrier 21 of the cover part 20 is made preferably of polypropylene. The gripping ring 23 is made preferably of a thermoplastic elastomer, for example of Santoprene™. The connecting element 24 is made preferably of metal and is preferably pressed into the carrier 21 of the cover part 20. The cover plate 22 is made preferably of stainless steel. Suitable symbols, indicating which condiment is ground in which direction of rotation using the salt and pepper mill, are preferably embossed in this cover.

Whereas the invention has been described with reference to a preferred exemplary embodiment, a large number of modifications and other configurations are obviously possible. Thus, the salt and pepper mill need not in particular have a circular outline, as is the case in the foregoing exemplary embodiment. On the contrary, the present invention allows broad latitude in the design. A broad range of materials may also be selected. Thus, for example, the entire outer housing of the base part 10 can be made of a transparent material, or the cover part can be manufactured in almost any other desired manner with regard to the material selected and shape.

The gear mechanism, illustrated in the present document by way of example, for selectively driving the grinding mechanisms can also be configured differently to that in the foregoing exemplary embodiment. In particular, in a simplified embodiment, a gear mechanism can be provided such as is illustrated in U.S. Pat. No. 4,709,865 (i.e. with grinding mechanisms operating in opposite directions). Alternatively, it is also possible to use a gear mechanism such as is illustrated in U.S. Pat. No. 4,844,352. In this document, a central gear wheel runs on a spindle having a quick-acting thread, is as a result vertically adjustable and can in this way selectively be brought into engagement with gear wheels driving the two grinding mechanisms.

The gearbox 30 can also be arranged at different locations in the base part 10 to that which is the case in the exemplary embodiment described hereinbefore. Thus, the gearbox can for example be downwardly displaced by a certain amount or can even be arranged just above the bottom of the housing lower part 11. However, in the latter case, it must be ensured that there is enough space between the grinding mechanisms and the gearbox to allow the peppercorns and salt crystals to enter the grinding mechanisms unimpeded.

LIST OF REFERENCE NUMERALS

1 Salt/pepper mill
10 Base part

11 Housing lower part
12 Transparent wall
13 Housing upper part
14 Partition
15 First filling opening
16 Second filling opening
17 Salt container
18 Pepper container
20 Cover
21 Carrier
22 Cover plate
23 Gripping region
24 Connecting element
25 Curved region
30 Gearbox
31 First (central) gear wheel
32 Second gear wheel
33 Third gear wheel
34 Fourth gear wheel (auxiliary gear wheel)
35 Fifth gear wheel
36 Pivoting arm
37 Housing lower part
38 Housing upper part
39 Bearing element
40 Covering
41 First transmission shaft
42 Second transmission shaft
43 Drive shaft
50, 50' Grinding mechanism
51, 51' Counter bearing (grinding cylinder, stator)
52, 52' Conical grinding wheel (rotor)
53, 53' Fixing nut
61 Guide bush
62 Outer wall region
63 Web
64 Sheathing
A First pivoting direction
B Second pivoting direction

The invention claimed is:

1. A spice mill for crushing two different condiments, comprising
a base part having a first and a second spice container and a first and a second grinding mechanism, the spice containers being arranged next to each other, the first grinding mechanism being arranged at a lower end of the first spice container and the second grinding mechanism being arranged at a lower end of the second spice container;
a cover part serving as a rotary handle and being removable from the base part to uncover upper filling openings for the first and second spice container; and
a gear mechanism which is connected to the grinding mechanisms and the cover part, the gear mechanism being formed in such a way that rotation of the cover part in a predetermined direction of rotation causes the first grinding mechanism to be driven and that rotation of the cover part in a second predetermined direction of rotation causes the second grinding mechanism to be driven, the gear mechanism being arranged in the base part and being encapsulated in a housing toward the spice containers.

2. The spice mill as claimed in claim 1, wherein the gear mechanism is arranged in an upper region of the base part in such a way that the housing of the gear mechanism at least partly bounds the filling openings.

3. The spice mill as claimed in claim 2, wherein the base part has at least one transparent or translucent side wall, the upper edge of which extending substantially at the same level as a lower edge of the housing of the gear mechanism or below said lower edge.

4. The spice mill as claimed in claim 1, having a round outline.

5. The spice mill as claimed in claim 1, wherein the base part has a bottom from which a partition extends upward and separates the first and second spice containers from each other, and wherein the gear mechanism rests on said partition in an upper region of the partition.

6. The spice mill as claimed in claim 5, wherein the gear mechanism is fastened to the partition.

7. The spice mill as claimed in claim 1, wherein in an upper region of the base part a guide bush is formed for the cover part, and wherein the guide bush is connected to an outer wall region of the base part via at least two webs.

8. The spice mill as claimed in claim 7, wherein the filling openings are bounded at least partly by the outer wall region, the guide bush and the webs.

9. The spice mill as claimed in claim 7, wherein the gear mechanism is arranged below and adjoins the guide bush.

10. The spice mill as claimed in claim 1, wherein a drive shaft is provided and extends upward from the gear mechanism, and wherein the cover part is releasably connectable to the drive shaft so as to produce in the directions of rotation a non-positive and/or positive connection.

11. The spice mill as claimed in claim 1, wherein the gear mechanism has a first, second, third and fourth gear wheel, wherein the first gear wheel is connected to the cover part via a drive shaft and is adapted to be driven by said cover part, wherein the second gear wheel is at all times in engagement with the first gear wheel and is mounted on an arm, which is able to pivot about the axis of rotation of the first gear wheel, in such a way that it in a first pivoting position enters into engagement with the third gear wheel and in a second pivoting position enters into engagement with the fourth gear wheel, and wherein the third gear wheel directly or indirectly drives the first grinding mechanism and the fourth gear wheel directly or indirectly drives the second grinding mechanism.

12. The spice mill as claimed in claim 11, wherein the third gear wheel is mounted on a first shaft which is connected to and drives the first grinding mechanism, and wherein the fourth gear wheel is in engagement with a fifth gear wheel which is mounted on a second shaft which is connected to and drives the second grinding mechanism.

13. The spice mill as claimed in claim 1, wherein the base part has a bottom from which a partition extends upward and separates the first and second spice containers from each other, and wherein the gear mechanism is fastened to said partition.

* * * * *